US006808157B1

United States Patent
Mudge et al.

(10) Patent No.: US 6,808,157 B1
(45) Date of Patent: Oct. 26, 2004

(54) HOLLOW PISTON RESTRICTOR

(75) Inventors: Dennis Mudge, Rocky Hill, CT (US); Russell P. Leonard, Plantsville, CT (US); Kimi A. Baranowski, Bristol, CT (US); Robert F. Ferrando, Wallingford, CT (US); Kazimierz Janowski, Newington, CT (US); Walter Luciuk, Windsor, CT (US)

(73) Assignee: Parker-Hannifin Corporation, Cleveland, OH (US)

( * ) Notice: Subject to any disclaimer, the term of this patent is extended or adjusted under 35 U.S.C. 154(b) by 0 days.

(21) Appl. No.: 10/600,068

(22) Filed: Jun. 20, 2003

Related U.S. Application Data (60) Provisional application No. 60/460,168, filed on Apr. 3, 2003.

(51) Int. Cl.[7] .............................................. F16K 31/126
(52) U.S. Cl. .................................... 251/30.03; 251/120
(58) Field of Search ................................. 257/120, 118, 257/30.03, 30.04, 30.05

(56) References Cited

U.S. PATENT DOCUMENTS

| | | | |
|---|---|---|---|
| 4,971,287 A | * 11/1990 | Shaw | ...................... 251/30.05 |
| 4,981,155 A | * 1/1991 | Pick et al. | .................... 251/120 |
| 5,269,333 A | * 12/1993 | Richmond | ................ 251/30.03 |
| 5,299,775 A | 4/1994 | Kolze | |
| 5,655,747 A | 8/1997 | Pasut | |
| 5,732,929 A | 3/1998 | Luppino et al. | |
| 5,758,863 A | 6/1998 | Buffet et al. | |
| 5,918,852 A | * 7/1999 | Otto | ......................... 251/30.04 |

* cited by examiner

Primary Examiner—John Bastianelli
(74) Attorney, Agent, or Firm—Joseph J. Pophal

(57) ABSTRACT

An improved solenoid valve assembly for controlling fluid flow having a valve body with an inlet and outlet, a diaphragm assembly with passages for providing fluid communication between the inlet and the outlet, and a movable seal pad responsive to an external signal for controlling flow through one of the passages. The improvement has the diaphragm assembly including a symmetrical fluid flow restrictor movable within the valve body, with a head portion, an intermediate portion and a guide portion surrounding a main body portion. The head portion has a fist end of the pilot passage which extends through the main body portion. The intermediate portion includes an annular extension with an upper side and a lower side. The guide portion has a plurality of legs extending from the main body portion for a distance substantially equal to the outer diameter of the annular extension, and is spaced from and interconnected with the intermediate portion by reduced diameter gullet portion.

22 Claims, 7 Drawing Sheets

HOLLOW PISTON RESTRICTOR

CROSS-REFERENCE TO RELATED CASES

The present application claims the benefit of the filing date of U.S. Provisional application Ser. No. 60/460,168, filed Apr. 3, 2003, the disclosure of which is expressly incorporated herein by reference.

FIELD OF THE INVENTION

The field of art to which this invention pertains includes that of solenoid valve assemblies and particularly to diaphragm assemblies for controlling the rate of flow therethrough.

BACKGROUND OF THE INVENTION

Valves are used to control the flow of fluids for various applications involved in hydraulic systems. For example, valves are used in the fuel dispensing market in order to provide and meter a proportional fluid flow of fuel One such valve is a pilot operated solenoid valve.

Typically these solenoid valves have an integrated diaphragm assembly moveable within the valve body of the solenoid valve. The diaphragm assembly is comprised of a diaphragm and a restrictor that can open and close a main passage between the solenoid valve inlet and outlet. In these designs, one side of the diaphragm is exposed to inlet fluid pressure and the opposite side of the diaphragm forms a chamber for receiving pressurized fluid. A solenoid, or alternatively an actuator, controls a pilot seal that blocks flow through a central pilot passage in the diaphragm assembly. The diaphragm assembly moves when the pressure differential acting on both sides of the diaphragm is sufficient to overcome forces, e.g. a spring, exerted on one side of the diaphragm. The diaphragm has a bleed passage allowing fluid to flow from the inlet into the chamber.

To open the valve and allow fluid to flow directly from the inlet to the outlet, the diaphragm must be moved off of a seat in the main valve body. Upon opening of the pilot passage, the main passage also opens and allows direct fluid communication between the solenoid valve inlet and outlet. It is imperative for many applications that the opening and closing of the main passage be conducted proportionally. This proportional opening and closing should be directly based on the actuation of the solenoid by the end user. It is difficult to control the proportional flow due to binding of the restrictor with the main valve body. Binding of the restrictor can cause no response after actuation or a quick response when the restrictor becomes unbound and suddenly roves.

Diaphragm assemblies having restrictor with multiple components can bind within a valve bore preventing movement of fluent movement of the diaphragm assembly. A multiple component restrictor could have a separate orifice body, flange portion, and guide portion. It is advantageous to have similar outside diameters for the flange and guide portions. When separate components are used, it is less likely that these two dimensions will be the same. Extra assembly steps are needed to sort through the component pieces in order to find components with similar dimensions. Tolerances on these parts can allow some deviance, which must coincide for all parts in order to produce a restrictor having a flange and guide with similar outer diameters. It is also much easier to manufacture the one-piece restrictor, rather than one with several pieces.

Diaphragm assemblies made of one piece can also stick within the valve bore when inlet radial fluid flow comes in contact with the guide of the restrictor. This contact can cause the restrictor to tilt relative to the longitudinal axis of the valve, and bind within the valve bore. This can occur with an open valve when the guide of the restrictor is in the radial path of the inlet fluid flow. Prior art references such as U.S. Pat. No. 5,299,775 to Kolze, U.S. Pat. No. 5,655,747 to Pasut, and U.S. Pat. No. 5,732,929 to Luppino et al. all show diaphragm assemblies with guides that come in contact with radial inlet fluid flow. These prior art designs can bind within the valve bore due to this contact.

SUMMARY OF THE INVENTION

The present invention provides a diaphragm assembly for use in a solenoid operated valve. The diaphragm assembly has a restrictor used in controlling fluid flow. The invention overcomes the obstacle of manufacturing and assembling a multiple piece restrictor and provides a single piece restrictor that controls fluid flow more proportionally.

A feature of the present invention is to provide an improved solenoid valve assembly for controlling fluid flow. The solenoid valve assembly is comprised of a valve body having an inlet and an outlet, a bore defining a main fluid passage in communication with the inlet and outlet, and a valve seat located on an innermost end of the bore between the inlet and outlet. The assembly further includes a diaphragm assembly, interposed between the valve body and a valve body cover and located between the inlet and outlet. The diaphragm assembly is engagable with the valve seat and movable for contacting the seat and closing the main fluid passage, as well as defining a chamber with the valve body. A passage within the diaphragm assembly provides fluid communication between the inlet and the chamber. A pilot passage in the diaphragm assembly provides fluid communication between the chamber and the outlet. A movable seal pad responsive to an external signal controls flow through the pilot passage. The diaphragm assembly includes the generally symmetrical fluid flow restrictor, movable within the valve body main fluid passage. The restrictor has a head portion, an intermediate portion and a guide portion surrounding a main body portion that has a pilot passage extending therethrough. The head portion has a first end of the pilot passage integrated therewith. The intermediate portion includes an annular extension with an upper side and a lower side. The guide portion has a plurality of legs radially extending from the main body portion for a distance substantially equal to the outer diameter of the annular extension. The guide portion is spaced from and interconnected with an intermediate portion by a reduced diameter gullet portion.

Another feature of the noted assembly includes having the annular extension being substantially cyclically. A further feature includes having an inwardly angled lower portion of the outer surface. Still a further feature has the longitudinal extent of the gullet portion being equal to or less than the maximum travel distance of the restrictor minus the longitudinal extent of the annular extension. Another feature includes having the head portion with a central cavity adapted for receiving an orifice body.

Still yet another feature of the noted assembly has the radial distal end portions of the plurality of legs being interconnected via a continuous, circular, annular perpheral portion. A firer feature has the annular peripheral portion having an outer diameter substantially equal to the outer diameter of the annular extension. Another feature has the outer diameter of the annular peripheral portion being slightly less than the diameter of the valve body main fluid passage.

Another attribute of the noted assembly has the diaphragm pilot passage with a diameter greater than that of the passage between the inlet and the chamber. A further attribute of the noted assembly has the main body portion, the head portion, the annular flange and the guide portion being of a one-piece construction.

DETAILED DESCRIPTION OF THE PREFERRED EMBODIMENTS

Figure 1:
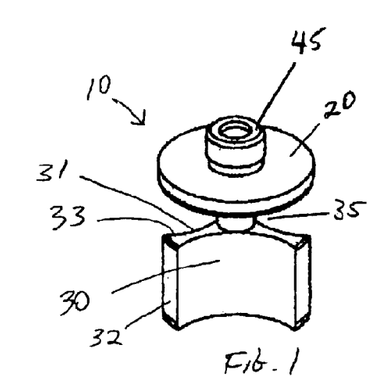
FIG. 1 is a downwardly-directed perspective view of a one-piece, hollow piston-type restrictor according to one embodiment of the present invention.
Figure 2:
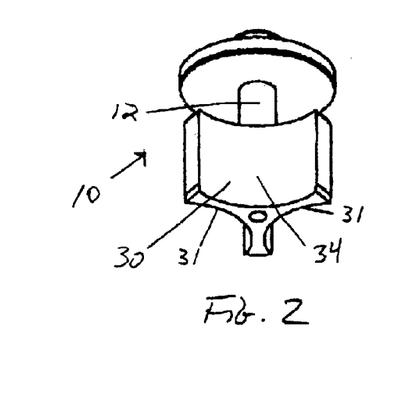
FIG. 2 is an upwardly-directed perspective view of the restrictor, of the restricted FIG. 1.
Figure 4:
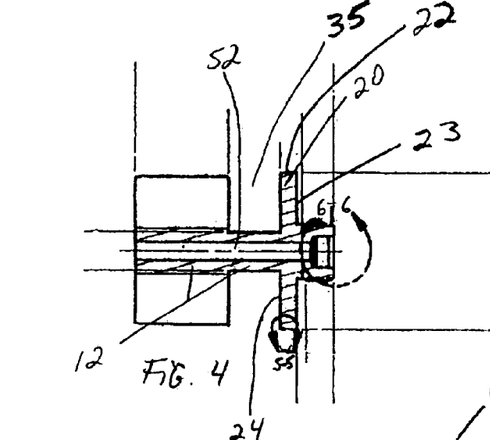
FIG. 4 is a longitudinal cross-sectional view of the restrictor taken along line 4—4 in FIG. 3.
Figure 6:
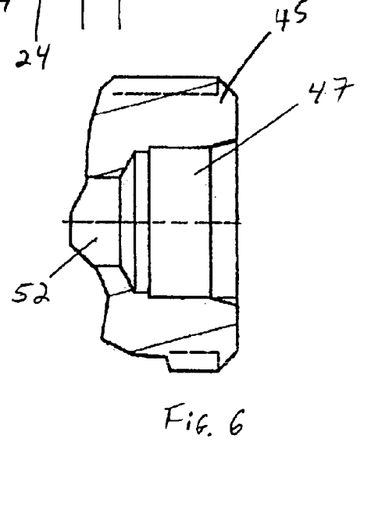
FIG. 6 is an enlarged view of the restrictor orifice taken along encircled portion 6—6 in FIG. 4.
Figures 7, 8:
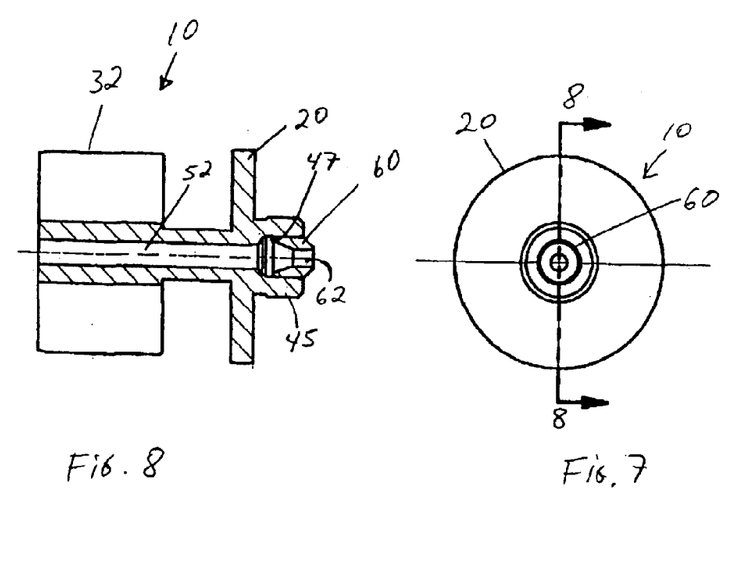
FIG. 7 is a top view of the one-piece restrictor having an orifice press-fitted therein.
FIG. 8 is a longitudinal cross-sectional view of the one-piece restrictor, with the press fitted orifice, taken along line 8—8 in FIG. 7.

Referring to the drawings and particularly to FIGS. 1, 2 and 4, there is shown a hollow piston-type restrictor 10 of a one-piece construction Restrictor 10 includes a main body portion 12, a circular flange or piston 20 and a multi-legged guide 30 having a similar, substantially equally dimensioned outside diametrical surface as said flange 20. A gullet or stepped neck portion 35 longitudinally separates flange 20 from guide 30. The extreme end, or top, of restrictor 10 includes a head portion 45 having a stepped bore 47, as best seen in FIG. 6, within its center. Bore 47 merges into a coaxial center passage 52 that extends freely longitudinally from bore 47 to the opposite end of restrictor 10. Passage 52 has a uniform diameter and is coaxial with the longitudinal axis of restrictor 10. Passage 52 is surrounded, and formed by, main body portion 12 throughout its longitudinal extent. Referring to FIG. 8, bore 47 is adapted to receive an orifice body 60 that is press fitted thereinto.

Figure 3:
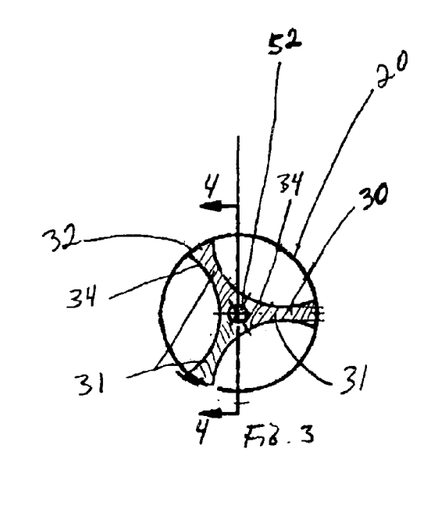
FIG. 3 is a bottom view of the restrictor according to the present invention.
Figure 9:
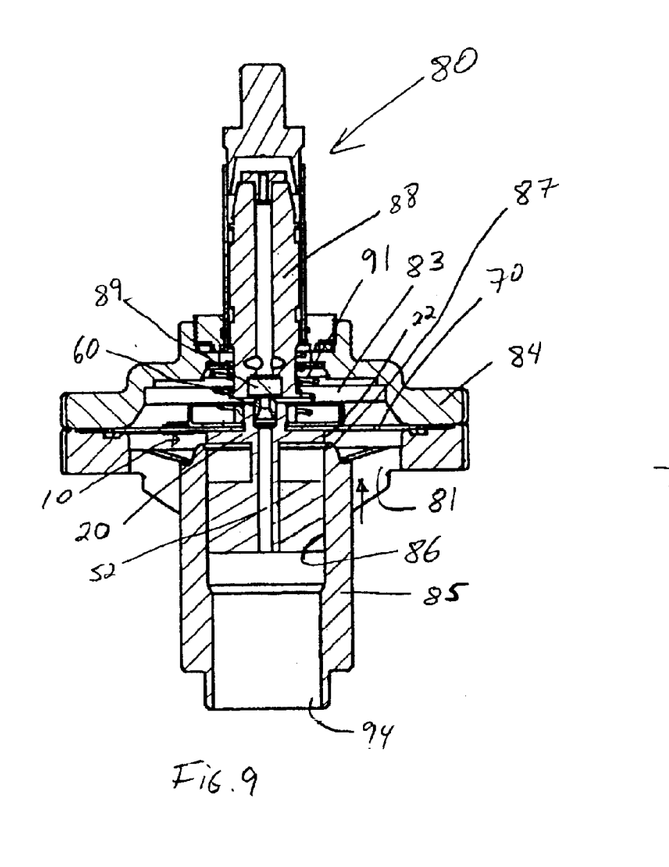
FIG. 9 is a longitudinal cross-sectional view of a portion of a solenoid valve having the one-piece restrictor of the present invention assembled there within.

Referring to FIG. 3, guide 30 is shown having three, preferably equally spaced, legs 31 radially extending from the center of restrictor 10. As mentioned above, the outer diametrical surfaces of guide legs 31 are substantially equal to and co-planar with the outer diameter of flange 20. Guide 30 thus has a plurality of curved outer edge or peripheral surfaces 32 which are dimensioned so as to be closely received within an inner cylindrical bore 86 of a valve body 85, the latter forming a part of a solenoid valve 80, a portion of which is shown in FIG. 9. The curvature of leg outer edge surfaces 32 is also substantially similar to that of the outer periphery of flange 20. As best shown in FIG. 2, each leg 31 of guide 30 has opposed curved shapes so that the connecting surfaces 34 between adjacent legs 31 form an outline of an arc portion of a partial cylinder.

Figure 5:
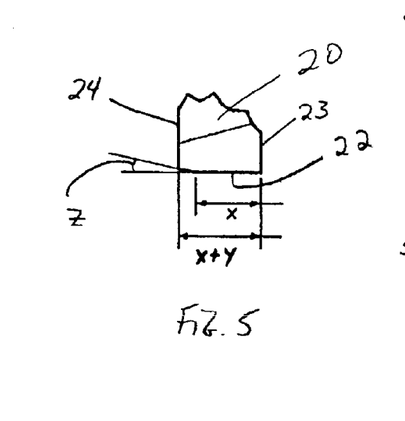
FIG. 5 is an enlarged view of a portion of the restrictor flange taken along encircled portion 5—5 in FIG. 4.

Referring to FIGS. 4 and 5, flange or piston 20 has an outer peripheral surface 22 with a substantially cylindrical shape. Peripheral surface 22 is comprised of a longitudinally flat portion x that terminates into an angled, or arced, portion y, at its lower edge, having an angle z, for example, in the range of 7° to 15°, and more specifically of 12° relative thereto. Flange 20 has parallel flat upper and lower surfaces 23, 24 respectively.

Figure 10:
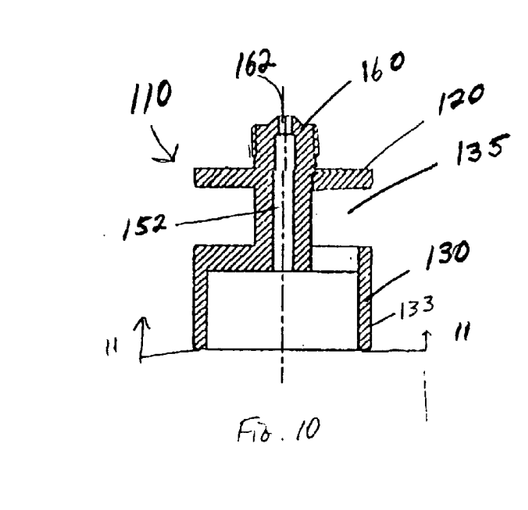
FIG. 10 is a longitudinal cross-sectional view of a further embodiment of the present invention, detailing a one-piece restrictor with an integrated orifice, taken along line 10—10 of FIG. 11.
Figures 11, 12:
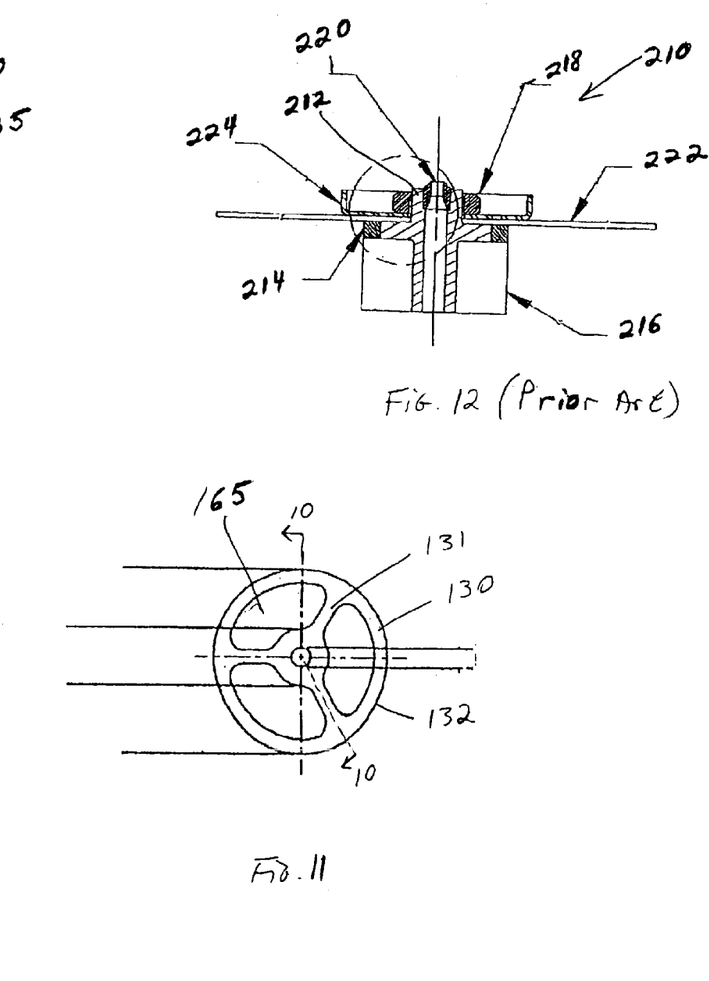
FIG. 11 is a bottom view of the further embodiment shown in FIG. 10.
FIG. 12 is a longitudinal cross sectional view of a prior art, multiple piece restrictor attached to a diaphragm.

Referring now to FIGS. 10 and 11, a further embodiment of the present invention is shown. A restrictor 110 similar to restrictor 10, discussed above, is detailed with two notable differences. Restrictor 110 includes an integral orifice 160 with a pilot passage 162 that are formed as part of the one-piece construction. This differs from restrictor 10 that uses a separate component for its orifice body 60. The other distinguishable feature is the design of its guide 130. Unlike guide 30, discussed above, guide 130 includes a continuous, circular, outer peripheral hoop portion 132, connecting adjacent legs 131. Outer peripheral portion 132 includes a peripheral surface 133 having a cylindrical shape and dimension so that it is adapted to be closely received within solenoid valve cylindrical bore 86.

Referring to FIG. 12, a prior art diaphragm assembly 210 is shown in cross-section. Diaphragm assembly 210 is comprised of a restrictor body 212, a separate restrictor annular portion 214, a guide 216, a nut 218, an orifice body 220, a diaphragm 222, and a retainer 224. In contrast thereto, the present invention has combined restrictor body 212 and restrictor annular portion 214 into one-piece restrictor in first embodiment 10, and has further integrated orifice body 220 into this one-piece construction in further embodiment 110. One of the significant differences between the present invention, including both embodiments 10, 110, and the prior art construction is that prior art guide 216 and restrictor annular portion 214 are juxtaposed and thus do not have a gap separating same. Referring specifically to FIG. 4, gullet 35 longitudinally displaces and separates guide 30 from flange 20. The same difference exists with restrictor 110, shown in FIG. 10, which has gullet 135.

The operation of the present invention will now be discussed. Solenoid valve 80 performs as a two-stage valve. The first stage is represented by fluid flow through passage 52 in restrictor 10. The second stage allows fluid to flow through bore 86 of valve body 85. Referring to FIGS. 8 and 9, fluid enters solenoid valve portion 80 through an inlet 81, travels through a hole or passage, not shown, in a diaphragm 70 and enters a chamber 83 located inwardly of diaphragm 70, the latter being interposed between valve body 85 and a valve body cover 84. When the solenoid actuator (not shown) is activated, a current is provided through a magnetic field (not shown), and begins to move an armature 88 longitudinally, thus overcoming the force of an opposing closing spring 91. When armature 88 moves, a stop, or seal pad 89 is moved away from orifice body 60 thereby allowing fluid, in chamber 83, to vent from chamber 83 into a pilot passage 62 in orifice body 60 and travel through passage 52 in restrictor 10. When fluid begins to exit chamber 83 at a rate faster than it is entering, fluid pressure is relieved on that side of diaphragm 70. This relief in fluid pressure causes diaphragm 70, and thus restrictor 10, to move. Pilot passage 62 has an area larger than that of the hole (not shown) in diaphragm 70 so that more fluid is entering passage 52 than is filling chamber 83, thus ensuring a drop in fluid pressure.

Prior to the movement of diaphragm 70, fluid entering inlet bore 81 is prevented from directly entering inner cylindrical bore 86 of solenoid valve portion 80 by the sealing position of diaphragm 70 on the axial edge of valve body top portion 87. Once diaphragm 70 begins its initial inward movement, the majority of fluid flow entering inlet bore 81 is still prevented from entering cylindrical bore 86 by the sealing position of flange 20 against inner bore 86. Since the outside diameter of flange 20 is nearly the same, and only very slightly less than the inside diameter of inner bore 86, outer edge surface 22 is in close contact with the surface of inner bore 86 and substantially prevents fluid from entering bore 86. Referring now to FIGS. 4, 5 and 9, as the current through the magnetic field is increased and restrictor 10 moves longitudinally inwardly, fluid begins to pass through the interface between surface 22 and bore 86 when angled portion, z, of surface 22 lines up with a top portion 87 of valve body 85. It should be noted that a small amount of fluid flows through the small gap, or annulus, created between flange 20 and the surface of inner bore 86 when restrictor 10 is not roved. The amount of fluid flow increases when restrictor 10 moves, as noted, so that angle portion z becomes adjacent with valve body top portion 87. The amount of fluid flow is significantly increased when flange 20 is completely longitudinally inwardly of top portion 87. In this position, gullet 35 is adjacent top portion 87, providing a flow path for the fluid. The further restrictor 10 travels longitudinally inwardly, the more flow is allowed to pass. When restrictor 10 fully completes its inward stroke, a full flow of fluid enters inner bore 86, flows past guide 30 and exits solenoid valve portion 80 at an outlet bore 94.

By slowly increasing the gap, or annulus, between restrictor 10 and valve body 85, with outer edge surface angled portion z, followed by the unencumbered gullet 35, fluid flow is proportionally increased and does not experience a sudden increase in flow as is experienced with the prior art design shown in FIG. 12. Guide 216 in prior art design diaphragm assembly 210 is in abutting contact with annular portion 214. In operation, when annular portion 214 travels inwardly and passes beyond valve body top portion 87, fluid flow from inlet 81 comes into contact with guide 216, rather than gullet 35 as is the case in the present invention. Initially this fluid flow radially contacts guide 216 and can thus force guide 216 to shift laterally. Guide 216 restricts the fluid flow into bore 86 by starving off flow at the location where the legs (not shown) are adjacent to valve body top portion 87 while allowing full flow at the location between the legs. This unbalanced flow, and force, cause guide 216 to move, shift, or flop, in the radial or lateral direction. Since there is but a small clearance between the distal surface of the guide legs and bore 86, the unimpeded fluid flow will radially shift guide 216 so that the distal end of the guide legs come into contact with the surface of bore 86. This shift, and contact, will in turn, cause an erratic longitudinal movement of guide 216 within bore 86, and even intermittent and/or complete binding of guide 216 within bore 86. Erratic longitudinal movement of guide 216 can cause sudden increases in flow through the solenoid valve. Binding of guide 216 within bore 86 can cause the solenoid valve to remain open after the deactivation of solenoid actuator. Upon the deactivation of the actuator, closing spring 91 is designed to return restrictor 10 and diaphragm 70 to the closed position wherein diaphragm 70 rests on valve top portion 87 and restrictor flange upper surface is adjacent top portion 87. Both erratic movement and binding will seriously diminish the functionality of a solenoid valve.

The stroke of restrictor 10 starts from a resting position in which flange 20 is radially adjacent valve body top portion 87. Specifically, flange upper sur 23 is not axially inward of top portion 87 so that the entire flange outer edge surface 22 is within valve body cylindrical bore 86. This position is indicative of solenoid valve 80 being closed and ensures, by means of diaphragm 70 covering valve body top portion 87, that flow from inlet 81 does not enter cylindrical bore 86. As diaphragm 70, and thus restrictor 10, begin their axially inward movement, fluid flow entering inlet 81 can enter cylindrical bore 86. When solenoid valve 80 is completely open, the stroke of restrictor 10 ends before any portion of guide 30 is axially inward of valve body top portion 87. In this completely open position, radial fluid flow from inlet 81 does not contact guide 30, thus preventing any shifting of restrictor 10.

The improved fluid flow through the valve is illustrated in FIGS. 13–16. These graphs show the flow of air, in counts, versus longitudinal movement of the restrictor, shown in milliamps. Air is chosen as the testing medium for several reasons. First, a typical application medium with which the present invention, and prior art, find utility is gasoline. For many reasons, including safety, testing is not performed with gasoline. There are alternative wet testing media, but they all present problems with cleanliness and ventilation. Therefore, air is used and has proven to be proportional with applicable media. Additionally the present invention can be applied for gas or air metering.

Figure 13:
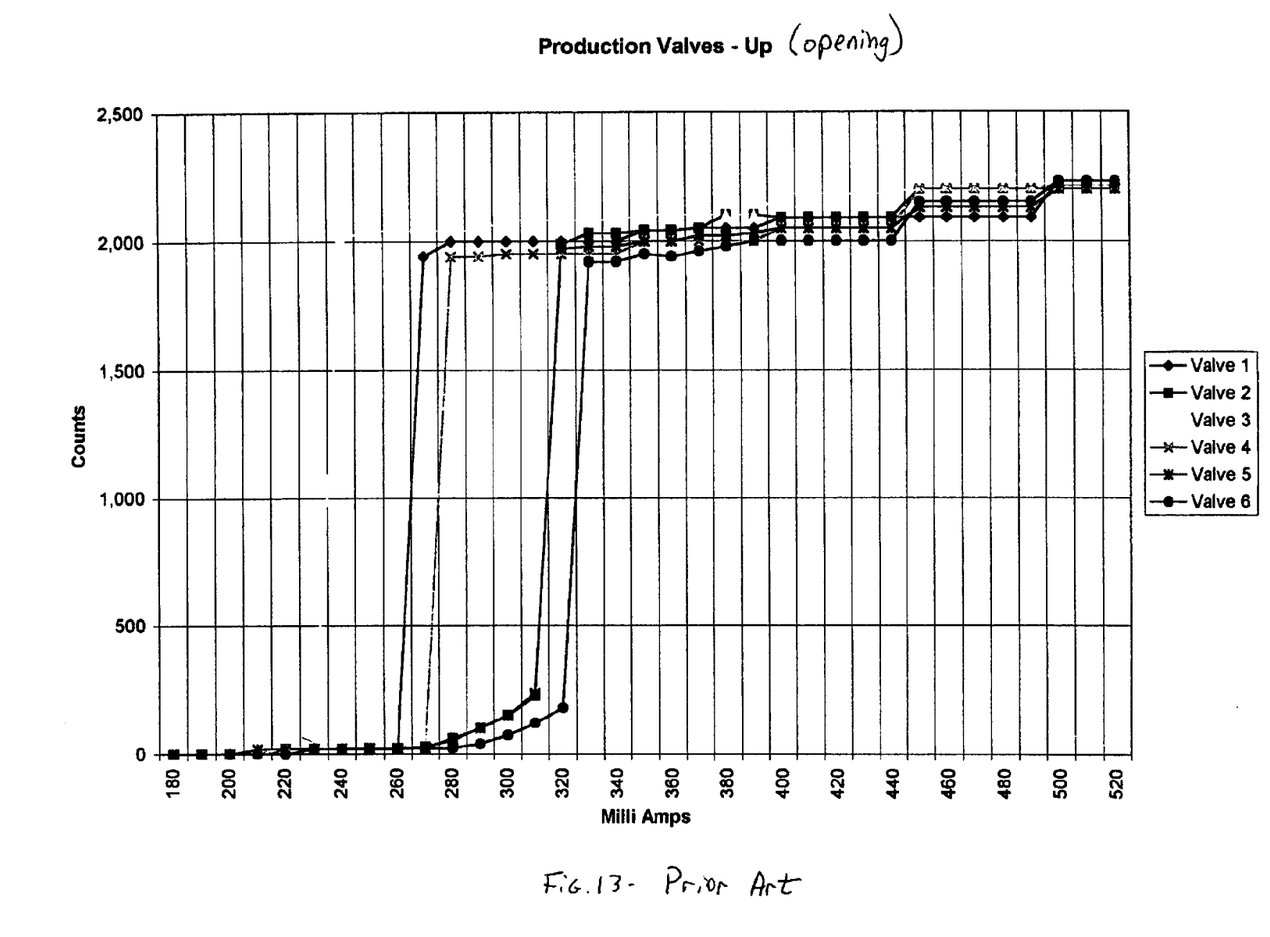
FIG. 13 is a graph showing measures of flow, in counts, taken at different positions of pluralities of values utilizing prior art restrictor, responding to amperages, while the restrictor are moving to an open position.
Figure 14:
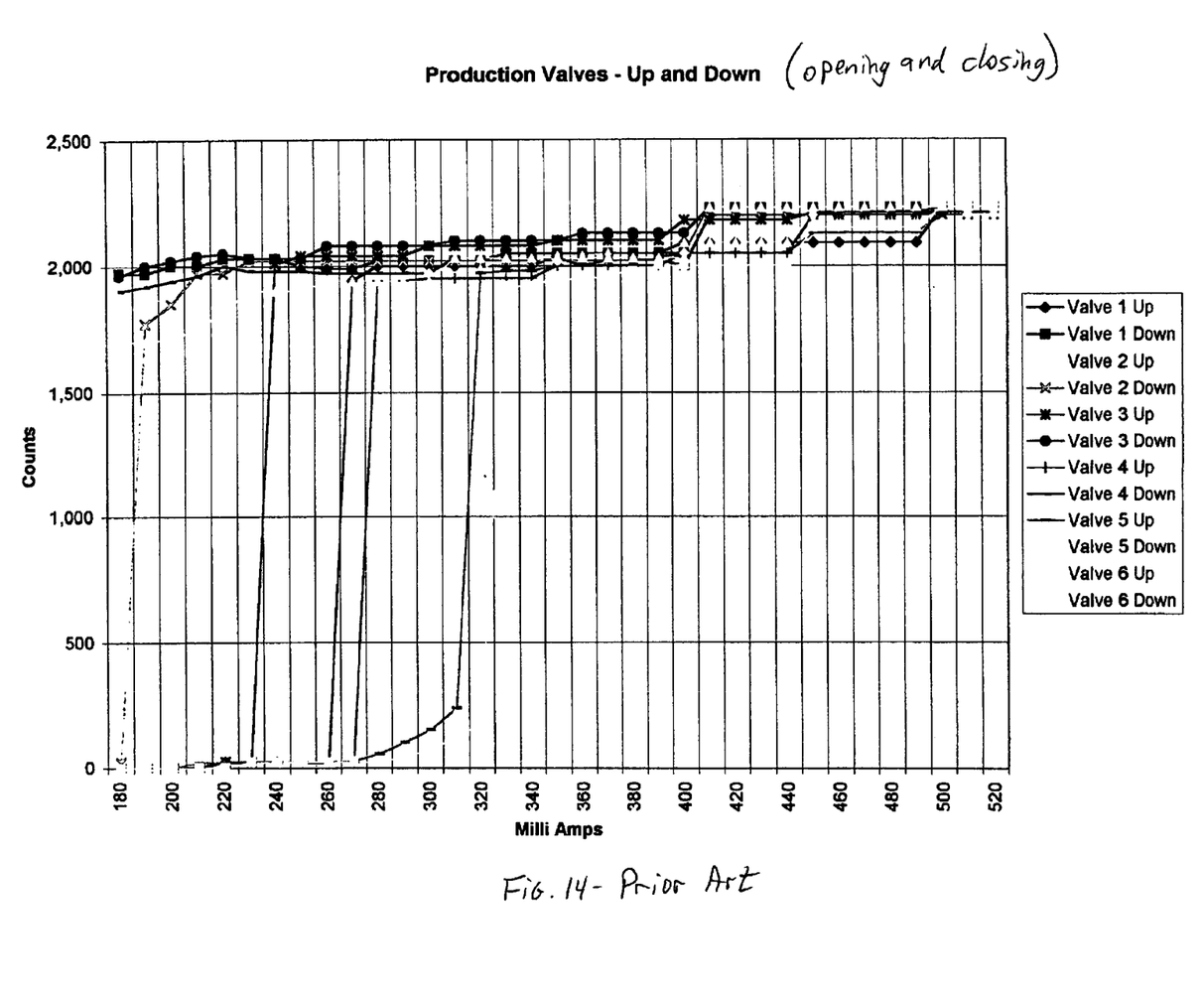
FIG. 14 is a graph similar to that shown in FIG. 13 and including the measures of flow while the values utilizing the prior art retractors are also closing.

In FIG. 13, fluid flow for opening up prior art valves, such as that shown in FIG. 12, is shown. As illustrated, fluid flow tends to jump dramatically instead of exhibiting the desired, smooth proportional change in flow. Likewise, in FIG. 14, a multi sample test is shown, not only with the valve opening, but also coming back down (closing). In this case, the opening movement of the valve shows the same spike as in FIG. 13, but flow from the closing movement is not shown in several samples since the valves never closed. Due to difficulties in maintaining the proper tolerances with the prior art, multi-component design, the finished O.D. of prior art guide 216 tends to fall outside of the required design tolerance. An out of specification O.D., e.g. too small, will cause guide 216 to stick within the valve bore. Of the several valve samples shown in FIG. 14, only one is shown to retreat to a minimal flow (close to 0 counts) and this sample has a severe flow drop-off at about 190 milliamps.

Figure 15:
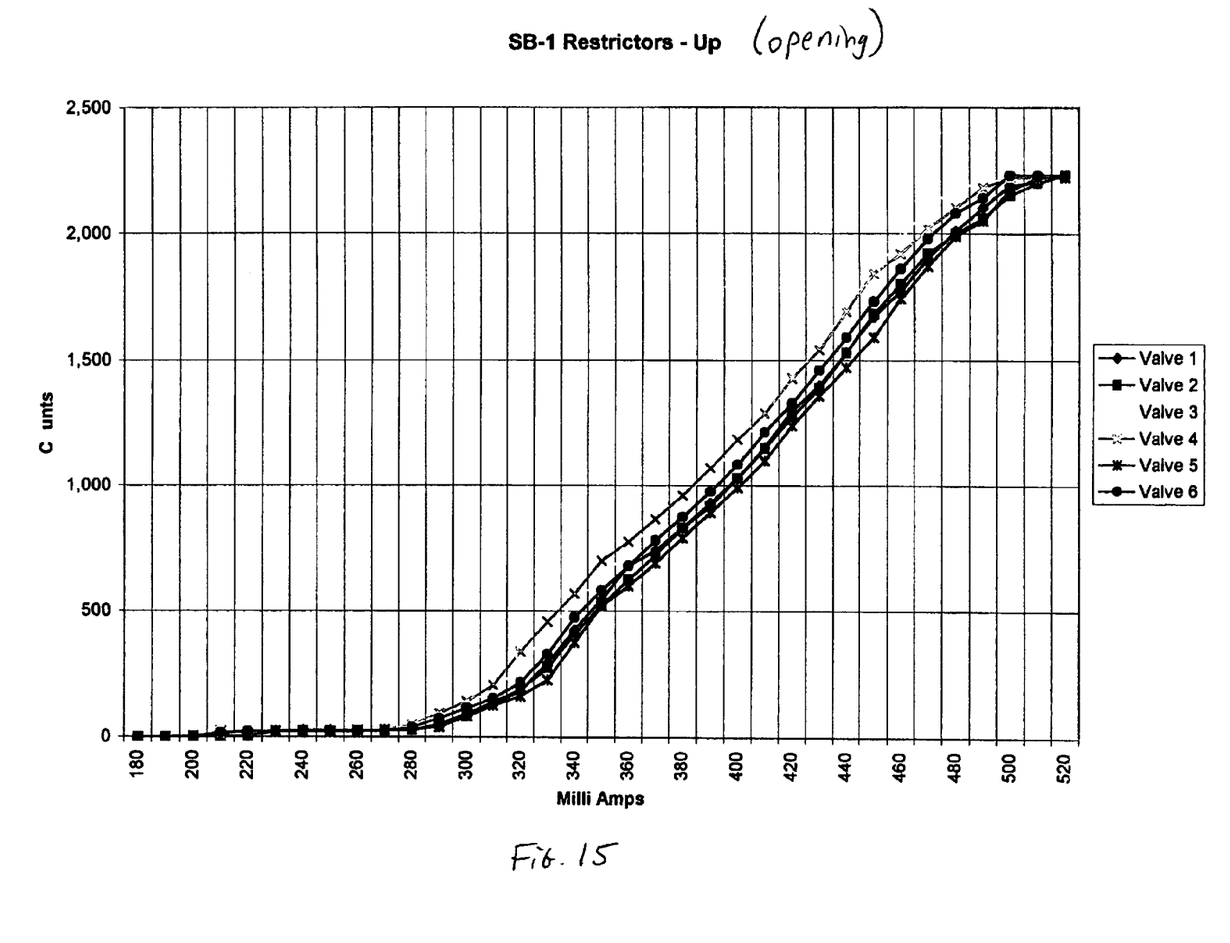
FIG. 15 is a graph similar to that shown in FIG. 13 but for pluralities of values utilizing restrictors according to the present invention.

FIG. 15 shows a multi sample test of the proportional fluid flow as the present invention restrictor moves inwardly. Unlike the graphs of the operation and the prior art construction (FIGS. 13 and 14) which exhibit an immediate, sharp rise in fluid flow when restrictor annular portion 214 passes valve body top portion 87, the present invention provides a proportional increase in fluid flow as restrictor 10 moves to a fully open position (at 520 milliamps). Initially, in the range from 180–280 milliamps, a limited amount of fluid flow passes through orifice body 60, when stop pad 89 is lifted off orifice body 60, and through the gap, or annulus, created between the O.D. of flange 20 and the I.D. of inner cylindrical bore 86 of valve body 85. This fluid flow increases, and is shown as the first ramped portion in the graph at about 290 milliamps, when angled, z, outer edge surface 22 of flange 20 is adjacent to valve body top portion 87. As gullet 35 portion passes valve body top portion 87, more medium is permitted to pass through valve body 85 and exit outlet 94. It should be noted that a top portion 33 of guide 30, seen in FIG. 1, never reaches the location adjacent to valve body top portion 87. Therefore, the present invention does not experience or exhibit the shifting, or binding, of guide 30 within bore 86. All of the medium flows longitudinally past guide 30 through bore 86 and does not initially radially or laterally contact guide 30 as is the case in the prior art construction. This is shown in the steady sloped portion of FIG. 15, prior to reaching the upper plateau in which solenoid valve 80 is fully open.

Figure 16:
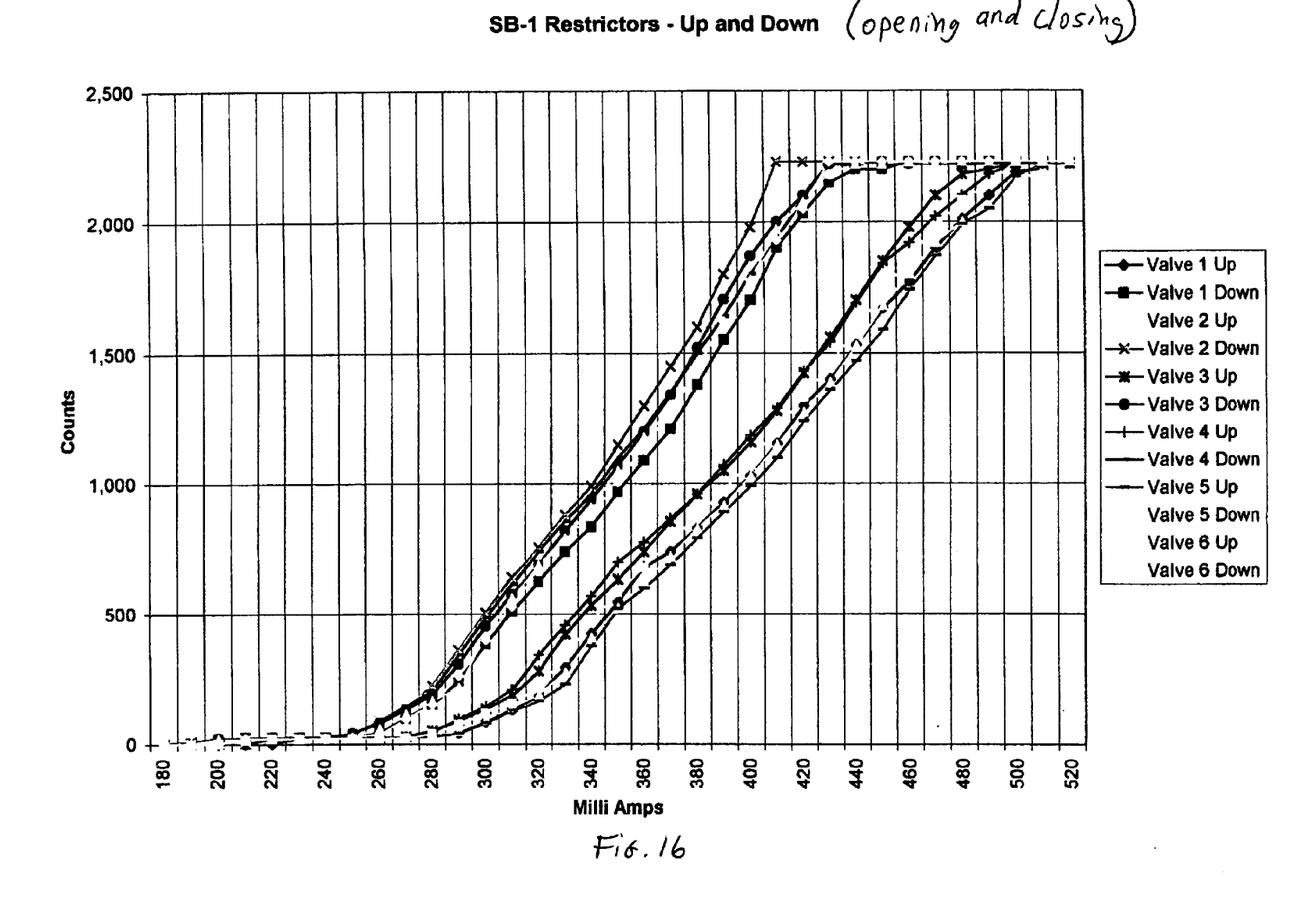
FIG. 16 is a graph similar to that shown in FIG. 14 but for pluralities of values utilizing restrictors according to the present invention.

FIG. 16 shows a graph of fluid flow (counts) versus longitudinal movement of restrictor (milliamps). Similar to that shown in FIG. 15, the inward movement of restrictor 10 produces a proportional increase in fluid flow. Unlike FIG. 14 (prior art), the return movement also produces a proportional decrease in the medium flow.

Embodiment 110, shown in FIGS. 10 and 11, produces the same proportional flow as embodiment 10 discussed above. Gullet 135 provides the same benefits as those exhibited with restrictor 10. Guide 130, with its circular, or hooplike, design has an outer diameter substantially equal to that of flange 120. Since guide 130 has a hoop-like design, a plurality of flow channels 165 are created between legs 131.

It should be noted that with the one or two-piece designs of the present invention, manufacturing thereof is much more precise. Compared with prior art designs, such as that shown in FIG. 12, which have at least three components (guide 216, restrictor annular portion 214, and orifice body 220), the present invention has reduced the componentry to two parts, as in embodiment 10, and to but one part, as in embodiment 110. By reducing the number of components, tolerance variances, including concentricity problems, are also reduced. Most notably, since guides 30, 130 and flanges 20, 120 respectively are integrated into a unitary piece, it is much easier to maintain substantially the equal outside dimensions of both. The substantially equal outside dimensions and curvatures provide smoother movement and operation of restrictors 10 and 110. With multiple pieces, a fabricator has to selectively sort through the pieces in order to provide for a restrictor/solenoid assembly with desired clearances. Although not shown, embodiment 10 can have integrated orifice body, similar to that shown with restrictor 110, further simplifying the manufacture and assembly of restrictor 10. If so desired, embodiment 110 can utilize the separate orifice 60 of embodiment 10.

What is claimed is:

1. A fluid flow restrictor, for use in a solenoid operated valve, comprised of:
   a main body portion, with a longitudinal bore extending therethrough, having a first longitudinal end and a second longitudinal end;
   a head portion, located at said first longitudinal end, peripherally surrounding said main body portion and having a first end of said longitudinal bore integrated therewithin;
   an annular flange located adjacent to said head portion, peripherally surrounding said main body portion and having a top side and a bottom side;
   a gullet having one end located adjacent said flange bottom side and forming an intermediate piece of said main body portion; and
   a guide portion, located adjacent another end of said gullet, having a plurality of legs radially extending from said main body portion, with an outer diametrical extent thereof being substantially equal to the outer diameter of said annular flange, said gullet serving to longitudinally separate said annular flange and said guide portion.

2. The restrictor as in claim 1 wherein said annular flange has an outer surface having a first portion which is parallel with the longitudinal axis of said restrictor and a second portion having an inwardly angled outer surface starting from said first portion and ending at said bottom side.

3. The restrictor as in claim 2 wherein said second portion has an angle in the range of 7°–15° relative to said first portion outer surface.

4. The restrictor as in claim 2 wherein said second portion has an angle in the range of 10°–14° relative to said first portion outer surface.

5. The restrictor as in claim 2 wherein said second portion has an angle of 12° relative to said first portion outer surface.

6. The restrictor as in claim 1 wherein said head portion has a separate bore for receiving an orifice body.

7. The restrictor as in claim 1 wherein said head portion includes an integral orifice.

8. The restrictor as in claim 1 wherein said main body portion, said head portion, said annular flange and said guide portion are part of a one-piece construction.

9. An improved solenoid valve assembly for controlling fluid flow, said assembly including:
   a valve body having an inlet and an outlet, a bore defining a main fluid passage in communication with said inlet and outlet, and a valve seat located on a innermost end of said bore between said inlet and outlet;
   a diaphragm assembly, interposed between said valve body and a valve body cover and located between said inlet and outlet, said diaphragm assembly being engagable with said valve seat and movable for contacting said seat and closing said main fluid passage, as well as defining a chamber within said valve body,;
   a passage within the diaphragm assembly for providing fluid communication between said inlet and said chamber;
   a pilot passage in the diaphragm assembly for providing fluid communication between said chamber and said outlet;
   a movable pad responsive to an external signal for controlling flow through said pilot passage,
   wherein the improvement comprises said diaphragm assembly including a generally symmetrical fluid flow restrictor, moveable within the valve body main fluid passage, said restrictor having a head portion, an intermediate portion and a guide portion surrounding a main body portion with said main body portion having the pilot passage extending therethrough, said head portion having a first end of said pilot passage integrated therewithin, said intermediate portion including an annular extension with an upper side and a lower side, said guide portion having a plurality of legs radially extending from said main body portion for a distance substantially equal to the outer diameter of said annular extension, with said guide portion being spaced from and interconnected with said intermediate portion by a reduced diameter gullet portion.

10. The improved solenoid valve assembly as in claim 9 wherein said annular extension is substantially cylindrical.

11. The improved solenoid valve assembly as in claim 10 wherein a lower portion of the outer surface of said substantially cylindrical annular extension is inwardly angled relative to the cylindrical outer surface.

12. The improved solenoid valve assembly as in claim 10 wherein a lower portion of the outer surface of said substantially cylindrical annular extension includes at least arc portions having radii smaller than the radius of said substantially cylindrical upper portion.

13. The improved solenoid valve assembly as in claim 9 wherein the longitudinal extent of said gullet portion is equal to or less than the maximum travel distance of said restrictor minus the longitudinal extent of said annular extension.

14. The improved solenoid valve assembly as in claim 9 wherein said head portion has a central cavity adapted for receiving an orifice body.

15. The improved solenoid valve assembly as in claim 9 wherein the radial distal end portions of said plurality of legs are interconnected via a continuous, circular, annular peripheral portion.

16. The improved solenoid valve assembly as in claim 15 wherein said annular peripheral portion has an outer diameter substantially equal to the outer diameter of said annular extension.

17. The improved solenoid valve assembly as in claim 16 wherein the outer diameter of said annular peripheral portion is slightly less than the diameter of said valve body main fluid passage.

18. The improved solenoid valve assembly as in claim 15 wherein said head portion includes a central cavity adapted for receiving an orifice body.

19. The improved solenoid valve assembly as in claim 9 wherein said diaphragm pilot passage has a diameter greater than the diameter of said diaphragm passage.

20. The solenoid valve assembly as in claim 9 wherein said restrictor is of a one-piece construction.

21. A diaphragm assembly for regulating fluid flow within a solenoid valve wherein said diaphragm assembly is adapted to move within a cavity of a valve body of said solenoid valve from an at rest position to a fully open position, said valve body having a valve seat located on an innermost end of said cavity, said diaphragm assembly being comprised of:

a main body portion, with a longitudinal bore extending therethrough, having a first longitudinal end and a second longitudinal end;

a head portion located at said first longitudinal end, peripherally surrounding said main body portion and having a first end of said longitudinal bore integrated therewithin;

a diaphragm located adjacent to and connected with said head portion and adapted to be moveable from said at rest position, in which said diaphragm is sealingly engaged atop said valve seat in a fully closed position, to said fully open position, in which said diaphragm moves longitudinally away from said valve seat;

an annular flange located adjacent to said diaphragm, peripherally surrounding said main body portion and having a top side and a bottom side, and being moveable with said diaphragm from said closed position, in which said top side is radially aligned with said valve seat, to said fully open position in which bottom side is axially spaced from said valve seat;

a reduced diameter gullet having one end located adjacent said flange bottom side and peripherally surrounding said main body portion, said gullet being moveable with said diaphragm from said closed position, in which said gullet is longitudinally located wholly within said valve body cavity, to said fully open position, in which said gullet is adjacent said valve seat; and a guide portion, located adjacent another end of said gullet, having a plurality of legs radially extending from said main body portion, with an outer diametrical extent thereof being substantial equal to the outer diameter of said annular flange, said guide portion being positioned wholly within said cavity in both said closed and fully open positions.

22. The diaphragm assembly of claim 21 wherein, except for said diaphragm, the remainder of said diaphragm assembly components are comprised of a unitary, single piece structure.

* * * * *